United States Patent
Yumisashi et al.

(10) Patent No.: US 10,012,132 B2
(45) Date of Patent: Jul. 3, 2018

(54) COOLING SYSTEM OF INTERNAL COMBUSTION ENGINE

(71) Applicant: AISIN SEIKI KABUSHIKI KAISHA, Kariya-shi, Aichi (JP)

(72) Inventors: Naoto Yumisashi, Nagoya (JP); Masanobu Matsusaka, Chita (JP)

(73) Assignee: AISIN SEIKI KABUSHIKI KAISHA, Kariya-Shi, Aichi (JP)

(*) Notice: Subject to any disclaimer, the term of this patent is extended or adjusted under 35 U.S.C. 154(b) by 8 days.

(21) Appl. No.: 15/125,923

(22) PCT Filed: Jun. 18, 2015

(86) PCT No.: PCT/JP2015/067622
§ 371 (c)(1),
(2) Date: Sep. 13, 2016

(87) PCT Pub. No.: WO2015/198963
PCT Pub. Date: Dec. 30, 2015

(65) Prior Publication Data
US 2017/0016381 A1 Jan. 19, 2017

(30) Foreign Application Priority Data
Jun. 25, 2014 (JP) .................. 2014-130539

(51) Int. Cl.
*F28D 7/00* (2006.01)
*F01P 7/16* (2006.01)
(Continued)

(52) U.S. Cl.
CPC .......... *F01P 7/165* (2013.01); *B60H 1/00978* (2013.01); *B60H 1/08* (2013.01);
(Continued)

(58) Field of Classification Search
CPC ............ B60H 1/00978; B60H 1/00007; B60H 1/00914; B60H 1/08; B60H 1/12;
(Continued)

(56) References Cited

U.S. PATENT DOCUMENTS 5,598,718 A * 2/1997 Freund ............... B60H 1/00914
62/238.6
5,641,016 A * 6/1997 Isaji ................... B60H 1/00007
165/43

(Continued)

FOREIGN PATENT DOCUMENTS

DE 10304837 A1 8/2004
EP 2463494 A2 6/2012

(Continued)

OTHER PUBLICATIONS

The extended European Search Report dated May 30, 2017, by the European Patent Office in corresponding European Patent Application No. 15811093.2 (8 pgs).

(Continued)

*Primary Examiner* — Davis Hwu
(74) *Attorney, Agent, or Firm* — Buchanan Ingersoll & Rooney PC

(57) ABSTRACT

A cooling system of an internal combustion engine includes a first flow passage supplying a cooling medium of the internal combustion engine to a radiator, a second flow passage branching from the first flow passage by a flow control valve to supply the cooling medium to a first heat exchanging portion, a third flow passage provided separately from the first flow passage to supply the cooling medium to a second heat exchanging portion via an on-off valve and a control portion controlling the on-off valve and the flow control valve based on a temperature of the cooling medium.

6 Claims, 5 Drawing Sheets

(51) Int. Cl.
    *B60H 1/08*    (2006.01)
    *F01P 3/20*    (2006.01)
    *F01P 7/14*    (2006.01)
    *B60H 1/00*    (2006.01)
    *B60H 1/12*    (2006.01)
    *F16K 1/12*    (2006.01)
    *F16K 11/085*  (2006.01)
    *F16K 31/04*   (2006.01)
    *F16K 31/06*   (2006.01)
    *F16K 31/53*   (2006.01)
    *B60H 1/20*    (2006.01)
    *F01P 11/14*   (2006.01)
    *F02M 26/28*   (2016.01)

(52) U.S. Cl.
    CPC .................. *B60H 1/12* (2013.01); *B60H 1/20* (2013.01); *F01P 3/20* (2013.01); *F01P 7/14* (2013.01); *F01P 7/16* (2013.01); *F01P 11/14* (2013.01); *F16K 1/12* (2013.01); *F16K 11/0853* (2013.01); *F16K 31/043* (2013.01); *F16K 31/0655* (2013.01); *F16K 31/0675* (2013.01); *F16K 31/535* (2013.01); *F01P 2007/146* (2013.01); *F01P 2031/00* (2013.01); *F01P 2037/00* (2013.01); *F01P 2060/045* (2013.01); *F01P 2060/08* (2013.01); *F01P 2060/16* (2013.01); *F02M 26/28* (2016.02)

(58) Field of Classification Search
    CPC ......... B60H 1/20; F16K 1/12; F16K 11/0853; F16K 31/043; F16K 31/0655; F16K 31/0675; F01P 7/165; F01P 2060/045; F01P 2060/08
    USPC .......................................................... 165/200
    See application file for complete search history.

(56) References Cited

U.S. PATENT DOCUMENTS

| | | | |
|---|---|---|---|
| 5,724,941 A | * | 3/1998 | Suzuki ............... B60H 1/00978 123/339.15 |
| 2012/0055652 A1 | | 3/2012 | Triebe et al. |
| 2012/0137993 A1 | | 6/2012 | Kim et al. |
| 2012/0227685 A1 | | 9/2012 | Ozawa et al. |
| 2013/0020513 A1 | | 1/2013 | Matsusaka et al. |

FOREIGN PATENT DOCUMENTS

| | | |
|---|---|---|
| JP | 2010-105570 A | 5/2010 |
| JP | 2011-102545 A | 5/2011 |
| JP | 2013-525653 A | 6/2013 |
| JP | 2013-234605 A | 11/2013 |
| JP | 5355723 B2 | 11/2013 |

OTHER PUBLICATIONS

Notification of Transmittal of Translation of the International Preliminary Report of Patentabilty (Forms PCT/IB/338 and PCT/IB/373) and the Written Opinion of the International Searching Authority (Form PCT/ISA/237) dated Jan. 5, 2017, by the International Bureau of WIPO in corresponding International Application No. PCT/JP2015/067622. (6 pgs).

International Search Report (PCT/ISA/210) dated Mar. 17, 2015, by the Japanese Patent Office as the International Searching Authority for International Application No. PCT/JP2015/067622.

Written Opinion (PCT/ISA/237) dated Mar. 17, 2015, by the Japanese Patent Office as the International Searching Authority for International Application No. PCT/JP2015/067622.

\* cited by examiner

COOLING SYSTEM OF INTERNAL COMBUSTION ENGINE

TECHNICAL FIELD

This invention relates to a cooling system of an internal combustion engine and more particularly to a technique for performing a temperature control of an internal combustion engine by a cooling medium such as coolant, for example.

BACKGROUND ART

A cooling system constructed in the aforementioned manner is disclosed in Patent document 1. Patent document 1 discloses a technique including a flow passage for sending out coolant of an engine to a heater core and a flow passage for sending out the coolant of the engine to a radiator, the aforementioned flow passages being provided separately from each other, and a water pump for returning the coolant of each of the flow passages to the engine. In Patent document 1, a coolant stop valve which is selectively opened and closed is provided at an engine side of the flow passage that sends the coolant to the heater.

The coolant stop valve in Patent document 1 is configured to include a valve body made of a magnetic material and configured to reach a closed state by making contact with a valve seat, a biasing means (spring) applying a biasing force in a direction where the valve body makes contact with the valve seat (in a closing direction) and a solenoid suctioning the valve body by an electromagnetic force so that the valve body makes contact with the valve seat. According to the aforementioned construction, the biasing force of the biasing means that biases the valve body in the closing direction is specified so that the valve body is opened by a pressure of the coolant.

Specifically, in Patent document 1, the flow passage sending out the coolant of the engine to the heater core and the flow passage sending out the coolant of the engine to the radiator are separately provided. Thus, a flow of the coolant to the radiator is secured even in a case where a malfunction such as disconnection occurs at the solenoid to thereby inhibit overheating of the engine.

Patent document 2 discloses a technique including a first flow passage, a second flow passage to each of which cooling water of an internal combustion engine is sent, the first flow passage and the second flow passage being provided separately from each other, and a water pump provided at a common flow passage where the cooling water of the first flow passage and the cooling water of the second flow passage join together so that the water pump returns the cooling water to the internal combustion engine. In Patent document 2, a fluid cooling means (radiator) is provided at the first flow passage for cooling the cooling water. In addition, a heat exchanging means is provided at the second flow passage for receiving heat of the cooling water. A first valve is provided at a joining portion of the first flow passage and the second flow passage. A second valve is serially provided at a position in series with the heat exchanging means at the second flow passage.

In Patent document 2, the first valve, which includes a thermostat, is configured to increase an amount of cooling water flowing through the first flow passage and the second flow passage with an increase of temperature of the cooling water. The second valve is configured as an electrically driven flow control valve which adjusts an amount of cooling water flowing to the heat exchanging means.

In Patent document 2, a first sensor detecting a temperature of the cooling water sent out from the internal combustion engine and a control apparatus controlling the first valve and the second valve are provided. The control apparatus is configured to perform a control for increasing an amount of cooling water flowing through the first flow passage by opening the first valve based on an operation of a heater of the first valve in a case where the control apparatus determines a malfunction of the second valve based on a detection result of the first sensor.

DOCUMENT OF PRIOR ART

Patent Document

Patent document 1: JP2013-525653A
Patent document 2: JP2011-102545A

OVERVIEW OF INVENTION

Problem to be Solved by Invention

In an automobile, for example, overheat of an internal combustion engine may occur due to a malfunction of a valve provided at a circulating system of a cooling medium of the internal combustion engine. A countermeasure against a case where the valve is broken down as disclosed in Patent document 2 is necessary. Specifically, in a case where a vehicle such as an automobile, for example, is driven in a cold region, a defroster is required for removing frost and condensation at a windshield. The defroster supplies air heated by heat of the cooling medium to the windshield. Thus, it may be desirable to securely supply the cooling medium to a heater core.

The internal combustion engine provided at the automobile, for example, as disclosed in Patent document 1, includes a flow passage for circulating the cooling medium such as cooling water, for example, to a radiator for a temperature control of the internal combustion engine and a flow passage for supplying the cooling medium to the heater core so as to control a temperature within the vehicle, for example. The vehicle such as the automobile, for example, may also include a flow passage for achieving a heat reception at an EGR cooler or an oil warmer, for example, in addition to the flow passages disclosed in Patent document 1.

In the aforementioned construction, the control of the temperature within the vehicle and the operation of the EGR cooler may be separately and independently performed. Nevertheless, in a case where the control of the temperature within the vehicle and the operation of the EGR cooler are separately and independently performed, it is necessary that the flow passage for supplying the cooling medium to the radiator, the flow passage for supplying the cooling medium to the heater core and the flow passage for supplying the cooling medium to the EGR cooler are separately provided and valves which are electrically controlled to open and close are provided at the respective flow passages. The aforementioned construction requires the three valves, which leads to a cost increase of the system. Thus, an improvement of the system may be considerable.

Therefore, it is desirable to construct a cooling system at a reduced cost which may restrain overheat of an internal combustion engine even in a case where a valve for controlling a cooling medium is broken down.

Means for Solving Problem

A characteristic construction of the invention includes a first flow passage circulating a cooling medium through an internal combustion engine and a radiator, a second flow passage branching from the first flow passage to circulate the cooling medium to a first heat exchanging portion which is different from the radiator, a third flow passage provided separately from the first flow passage to circulate the cooling medium from the internal combustion engine to a second heat exchanging portion, a flow control valve provided at a branching portion from the first flow passage to the second flow passage and configured to adjust an amount of the cooling medium supplied to each of the first flow passage and the second flow passage by a control of an electric actuator, an on-off valve provided in series with the second heat exchanging portion at the third flow passage and opening and closing the third flow passage by a control of an electromagnetic solenoid, and a control portion controlling the flow control valve and the on-off valve based on a heating state of the cooling medium.

In the aforementioned construction, the on-off valve is configured to open and close by the control of the electromagnetic solenoid. Thus, as compared to the flow control valve, the on-off valve includes a small number of mechanical operating portions to thereby securely open and close. In addition, according to the on-off valve configured to close the flow passage by power supply to the electromagnetic solenoid, the on-off valve is able to change to an open state by a pressure of the cooling medium even in a case where a disconnection occurs at the electromagnetic solenoid. The on-off valve is unlikely to be brought to a locked state. Specifically, even in a state where the supply of the cooling medium to the radiator is impossible because of a malfunction of the flow control valve, the cooling medium is supplied to the second heat exchanging portion via the on-off valve so that heat radiation is available. Further, it is not necessary to provide an exclusive valve for controlling the cooling medium supplied to the radiator. Thus, a cost increase is restrained as compared to a construction including the exclusive valve. The cooling system which restrains overheat of the internal combustion engine even in a case where the valve that controls the cooling medium is broken down is constructed at a reduced cost.

As another construction, the control portion may include a malfunction determining portion determining a malfunction of the flow control valve, the control portion performing a control for opening the on-off valve in a case where the malfunction determining portion determines the malfunction.

Accordingly, the on-off valve is opened in a case where the malfunction determining portion determines the malfunction of the flow control valve. Thus, even in a state where the heat radiation of the cooling medium is impossible at the radiator as in a case where the flow control valve is broken down in the closed state, for example, heat of the cooling medium sent out from the internal combustion engine is radiated at the second heat exchanging portion to avoid overheat.

As still another construction, the control portion may include an availability determining portion determining whether or not a heat removal from the cooling medium at the second heat exchanging portion is available, the control portion opening the on-off valve in a case where the availability determining portion determines that the heat removal from the cooling medium is available and a heat exchanging request is made to the second heat exchanging portion.

For example, according to an automobile, the temperature of the cooling medium immediately after the start of the internal combustion engine is low. Thus, heating effect is not obtainable by the supply of the cooling medium to the second heat exchanging portion for heating a vehicle interior. On the other hand, according to the present construction where the on-off valve is opened when the heat exchanging request is made in a state where the availability determining portion determines the heat removal from the cooling medium is available, the on-off valve is inhibited from opening even when the heat exchanging request is made in a state where it is not determined that the heat removal is available. Thus, a wasteful control is eliminated to securely remove heat from the cooling medium.

As still another construction, the availability determining portion may determine that the heat removal from the cooling medium is available in a case where a temperature of the cooling medium detected by a temperature sensor exceeds a setting value.

Accordingly, the availability of the heat removal from the cooling medium is determined on a basis of the temperature of the cooling medium, so that the determination at the availability determining portion is accurate.

As still another construction, the availability determining portion may determine that the heat removal from the cooling medium is available in a case where an integrated supply time of the cooling medium supplied to the first heat exchanging portion via the second flow passage exceeds a setting value.

Accordingly, in a case where a state in which the cooling medium is supplied to the second heat exchanging portion is continued while the internal combustion engine is in an operating state and the integrated supply time exceeds the setting value, it is presumable that the temperature of the cooling medium sufficiently increases so that the determination is reasonable.

As still another construction, the availability determining portion may determine that the heat removal from the cooling medium is available in a case where an integrated supply amount of the cooling medium supplied to the first heat exchanging portion via the second flow passage exceeds a preset value.

Accordingly, in a case where the state in which the cooling medium is supplied to the second heat exchanging portion is continued while the internal combustion engine is in the operating state and the integrated supply amount exceeds the preset value, it is presumable that the temperature of the cooling medium sufficiently increases so that the determination is reasonable.

As still another construction, the cooling system of the internal combustion engine includes a bypass flow passage bypassing the flow control valve at the first flow passage from an upstream position relative to the flow control valve, and a second on-off valve provided at the bypass flow passage and including a same construction as the on-off valve, and the control portion includes a malfunction determining portion determining a malfunction of the flow control valve, the control portion opening the second on-off valve in a case where the malfunction determining portion determines the malfunction.

Accordingly, the second on-off valve is opened in a case where the malfunction determining portion determines the malfunction of the flow control valve. Thus, even in a state where the supply of the cooling medium from a cooling medium control valve to the radiator is impossible as in a case where the flow control valve is broken down in the closed state, for example, the cooling medium sent from the internal combustion engine is supplied to the radiator via the second on-off valve to avoid overheat.

MODE FOR CARRYING OUT THE INVENTION

An embodiment of the present invention is explained with reference to drawings.

Entire Construction

Figure 1:
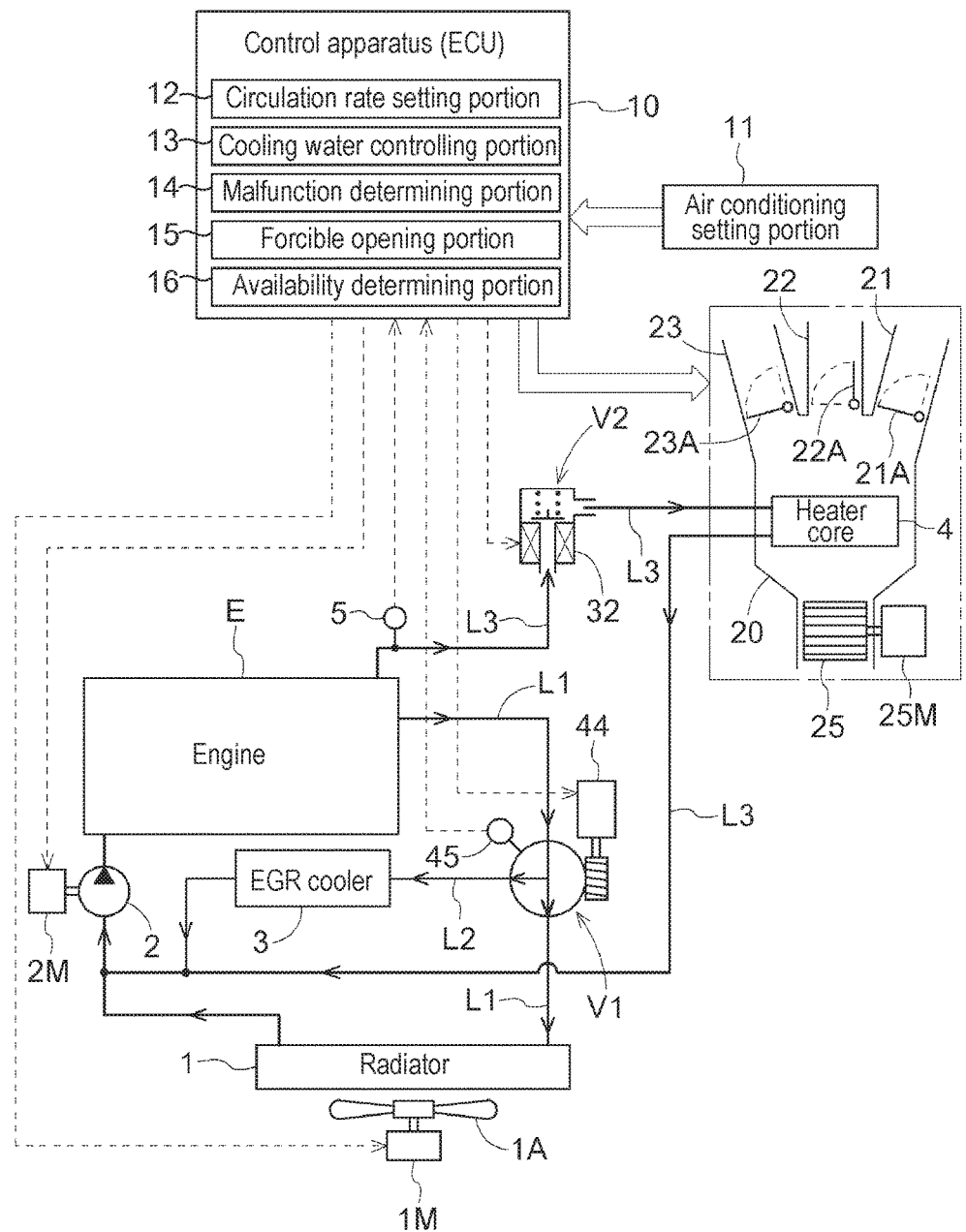
FIG. 1 is a block diagram illustrating an entire construction of a cooling system of an internal combustion engine.

FIG. 1 illustrates a cooling system including a first flow passage L1, a second flow passage L2 and a third flow passage L3. The first flow passage L1 supplies cooling water (an example of a cooling medium) stored at a water jacket of an engine E serving as an internal combustion engine to a radiator 1. The second flow passage L2 branches from the first flow passage L1. The third flow passage L3 is provided separately from the first flow passage L1 so that the cooling water from the water jacket is supplied to the third flow passage L3.

The cooling system is provided at a vehicle such as a passenger automobile, for example. A flow control valve V1 and the radiator 1 are arranged in series at the first flow passage L1 along a flow direction of the cooling water. A water pump 2 is also provided at the first flow passage L1 for returning the cooling water that passes through the radiator 1 to the engine E. An EGR cooler 3 serving as a first heat exchanging portion is provided at the second flow passage L2 which is provided brunching from the flow control valve V1. The cooling water that passes through the EGR cooler 3 is supplied to the water pump 2. An on-off valve V2 and a heater core 4 serving as a second heat exchanging portion are arranged in series at the third flow passage L3 along the flow direction of the cooling water. The cooling water that passes through the heater core 4 is supplied to the water pump 2.

The cooling system includes a water temperature sensor 5 serving as a temperature sensor at the third flow passage L3. The water temperatures sensor 5 measures a temperature of the cooling water discharged from the engine E. The water pump 2 is configured to be driven by an electric-type pump motor 2M. The radiator 1 includes a radiator fan 1A driven by an electric-type fan motor 1M. Further, the cooling system includes a control apparatus 10 (an example of a control portion) functioning as an ECU which performs a control for controlling a temperature of the engine E based on temperature information measured by the water temperature sensor 5.

The flow control valve V1, which is electrically controllable, also functions as a three-way valve for separating the cooling water of the first flow passage L1 so that a portion of the cooling water is sent to the second flow passage L2.

The flow control valve V1 is configured to be switchable to a closed state for interrupting a flow of the cooling water at each of the first flow passage L1 and the second flow passage L2 and to an adjusted state for adjusting a flow amount of the cooling water in a non-step manner. The on-off valve V2, which is electrically controllable, is configured to be switchable to an open state for allowing the flow of the cooling water at the third flow passage L3 and to a closed state for interrupting the flow of the cooling water at the third flow passage L3.

The control apparatus 10 is configured to control an air conditioner in addition to controlling the temperature of the engine E. The vehicle includes a duct 20 serving as the air conditioner for circulating air that is heated by the heater core 4 within the vehicle. A blower 25 is provided at an intake side of the duct 20 in a state being driven by a blower motor 25M. A defroster outlet 21 sending the air to a defroster, a face outlet 22 blowing out the air in a direction of a driver's face, for example, at a driver's seat and a foot outlet 23 blowing out the air to a driver's foot are provided at a side of the duct 20 to which the air (warm air) heated by the heater core 4 is sent.

In the air conditioner, a defroster damper 21A controlling a flow of the air to the defroster outlet 21 and an electric motor driving the defroster damper 21A are provided. In the same way, a face damper 22A controlling the flow of the air to the face outlet 22 and an electric motor driving the face damper 22A are provided. Further, a foot damper 23A controlling the flow of the air to the foot outlet 23 and an electric motor driving the foot damper 23A are provided.

The control apparatus 10 is configured to obtain a setting signal from an air conditioning setting portion 11 and configured to include output signals for controlling the flow control valve V1, the on-off valve V2, the pump motor 2M of the water pump 2 and the fan motor 1M of the radiator 1. Further, the control apparatus 10 includes output signals for controlling the blower motor 25M and the respective electric motors driving the three dampers of the air conditioner.

Based on the aforementioned construction, the control apparatus 10 controls the flow control valve V1 and the water pump 2 so as to achieve cooling of the engine E by a circulation of the cooling water from the engine E in a manner that the cooling water is supplied to the radiator 1 via the first flow passage L1 and thereafter is returned to the engine E. In addition, a portion of the cooling water supplied to the first flow passage L1 is supplied to the EGR cooler 3 from the second flow passage L2 so that cooling of an EGR gas is achievable. Further, the on-off valve V2 is opened so that heat of the cooling water is added to the air, which may lead to heating within the vehicle, for example. A control method of the control apparatus 10 is explained later.

Modified Example of System

In the cooling system of the embodiment, the water pump 2 is configured as an electric water pump. Alternatively, for example, the water pump 2 may be configured to directly receive a driving force of the engine E or to receive a driving force of the engine E via a clutch mechanism. The water pump including the aforementioned construction is impossible to adjust a circulation rate of the cooling water, however, is unlikely to be broken down as compared to the water pump with the electric motor, which may achieve a reduced cost of the cooling system.

In addition, the water temperature sensor 5 is arranged at the position for measuring the water temperature of the third flow passage L3. Alternatively, the water temperature sensor 5 may be arranged to measure the water temperature of the first flow passage L1. Further alternatively, the water temperature sensor 5 may be arranged so as to measure both the water temperature of the first flow passage L1 and the water temperature of the third flow passage L3.

Instead of the EGR cooler 3 as the first heat exchanging portion, an oil warmer which aims to increase a temperature of fluid of an automatic transmission or of hydraulic oil used for hydraulic equipment may be provided. In addition, the first heat exchanging portion may be configured to be utilized as an exhaust heat recovery portion recovering heat generated at the engine E.

Flow Control Valve

Figure 2:
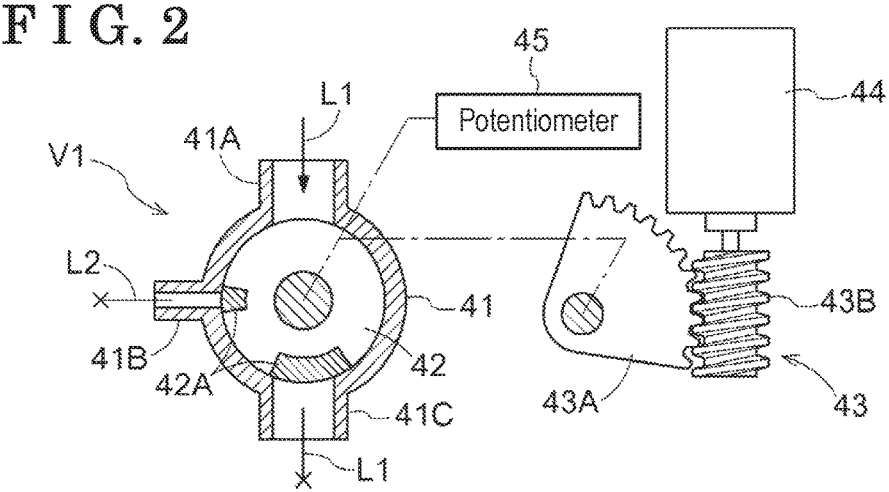
FIG. 2 is a diagram illustrating a flow control valve in a closed state.
Figure 3:
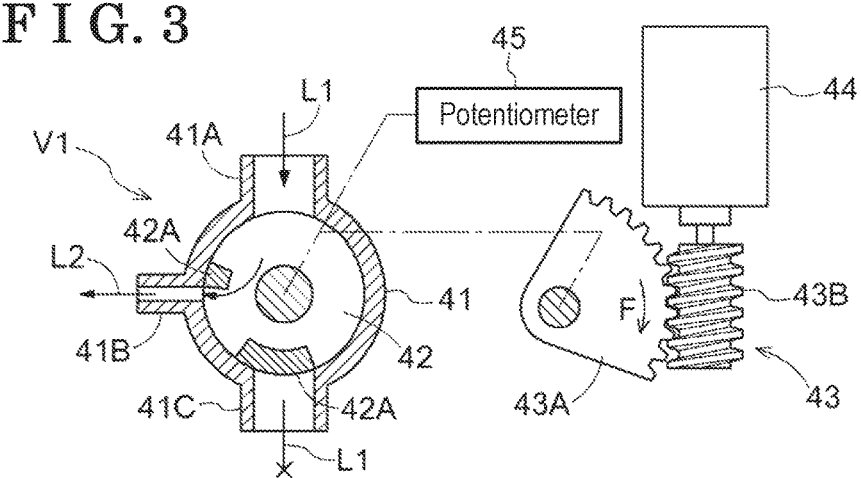
FIG. 3 is a diagram illustrating the flow control valve in a state supplying cooling water to a second flow passage.
Figure 4:
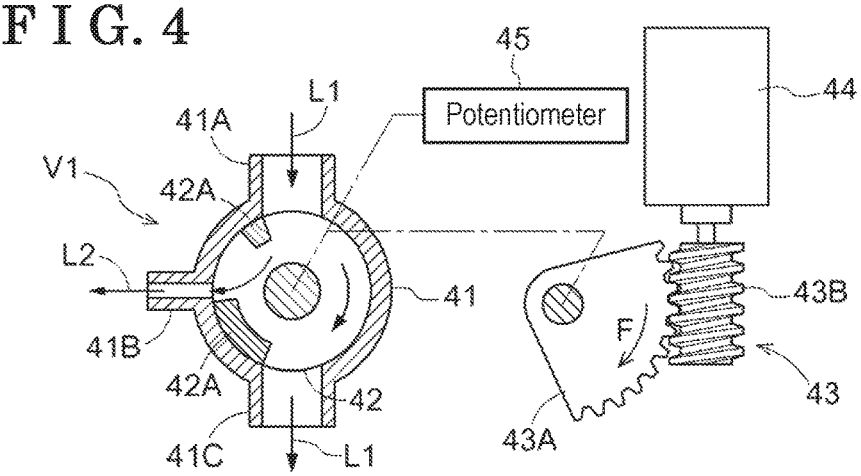
FIG. 4 is a diagram illustrating the flow control valve in a fully open state.

As illustrated in FIGS. 2 to 4, the flow control valve V1 is configured to include a tubular housing 41 with reference to an axis and a valve member 42 housed within the housing 41 to be relatively rotatable on the same axis as the aforementioned axis. A supply passage 41A supplied with the cooling water from an upstream side of the first flow passage L1, a branch passage 41B sending out the cooling water to the second flow passage L2 and a discharge passage 41C connecting the cooling water to a downstream side of the first flow passage L1 are provided at the housing 41. A pair of control valve portions 42A for controlling the flow of the cooling water to the branch passage 41B and the discharge passage 41C is integrally provided at the valve member 42. As a result, the flow control valve V1 includes a function of a flow control for controlling the amount of cooling water supplied to the first flow passage L1 and the second flow passage L2 and a function of the three-way valve.

The flow control valve V1 includes a reduction gear 43 constituted by a sector gear 43A integrally rotating with the valve member 42 and a worm gear 43B meshed with the sector gear 43A. The flow control valve V1 includes a valve control motor 44 serving as an electric actuator which rotatably operates the valve member 42 via the reduction gear 43 and a potentiometer 45 serving as an angle sensor detecting a rotation angle of the valve member 42 for determining an opening between the branch passage 41B and the discharge passage 41C.

In the flow control valve V1, the reduction gear 43 including a worm gear type is utilized so that the opening is inhibited from changing even when a pressure from the cooling water is applied. In the flow control valve V1, instead of the potentiometer 45, a rotary encoder may be provided as the angle sensor.

In the flow control valve V1, the valve member 42 is specified in a closed state as illustrated in FIG. 2 so that a state where the first flow passage L1 and the second flow passage L2 are closed by the pair of control valve portions 42A is maintained. In the aforementioned state, the valve member 42 is rotated in a direction F by a driving of the valve control motor 44 so that an inner void of the housing 41 is first connected to the branch passage 41B as illustrated in FIG. 3 to thereby supply the cooling water to the second flow passage L2. Next, the valve member 42 is further rotated in the direction F so that the inner void of the housing 41 is connected to the discharge passage 41C to thereby supply the cooling water to a downstream side of the first flow passage L1 relative to the flow control valve V1.

Then, a state illustrated in FIG. 4 is achieved so that a restriction by the pair of control valve portions 42A is cancelled. Each of the branch passage 41B and the discharge passage 41C is brought to a fully open state to maximize the amount of cooling water supplied to the first flow passage L1 and the second flow passage L2. In the aforementioned fully open state, the amount of cooling water flowing to the supply passage 41A (second flow passage L2) is greater than the amount of cooling water supplied to the first flow passage L1 positioned at the downstream side relative to the flow control valve V1.

On-Off Valve

Figure 5:
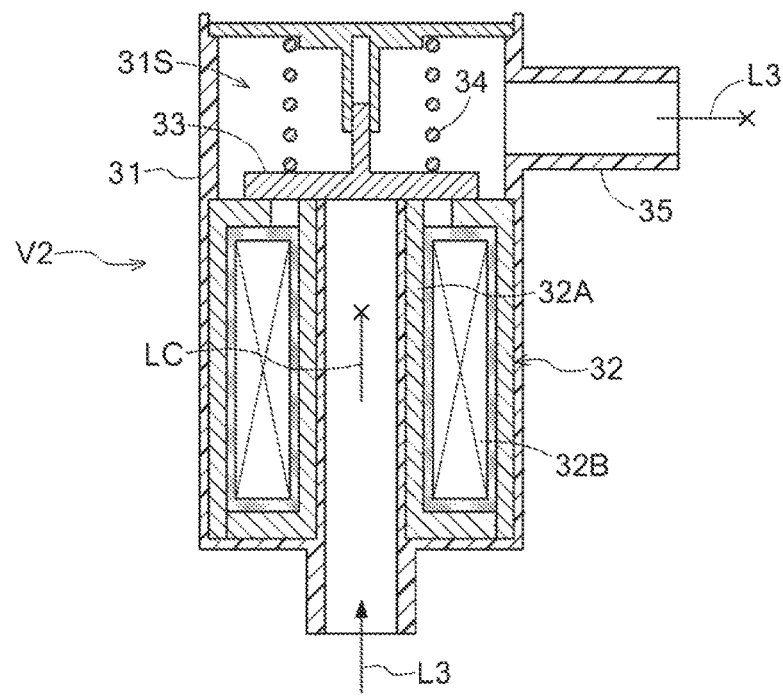
FIG. 5 is cross-sectional view of an on-off valve in a closed state.
Figure 6:
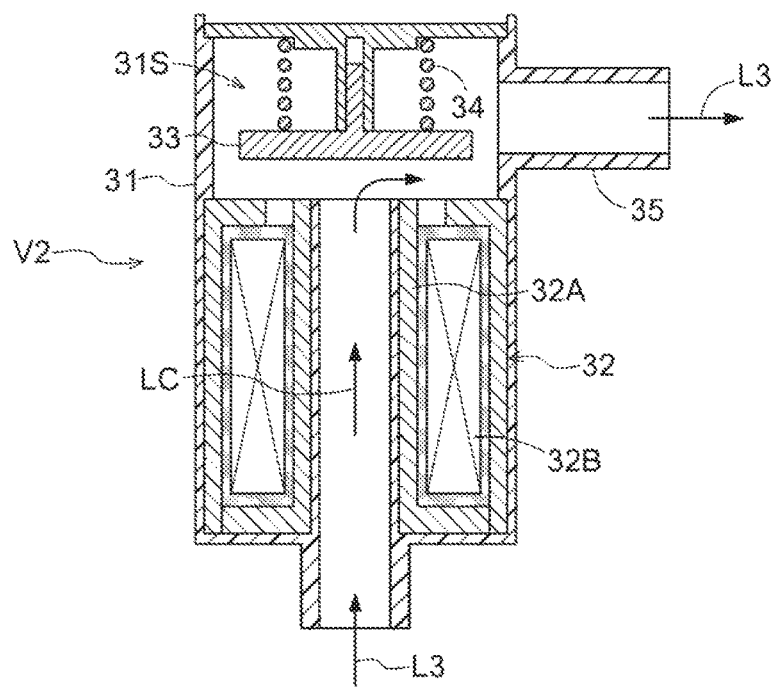
FIG. 6 is a cross-sectional view of the on-off valve in an open state.

As illustrated in FIGS. 5 and 6, the on-off valve V2 is configured to include an electromagnetic solenoid 32 arranged at a region surrounding a control flow passage LC (a portion of the third flow passage L3) within a case 31, a valve body 33 housed at a valve void 31S within the case 31 and a coil spring 34 biasing the valve body 33 in a closing direction thereof. In addition, a discharge tube 35 is provided at the valve void 31S.

The electromagnetic solenoid 32 includes a core 32A in a tubular form for defining the control flow passage LC and a coil 32B at which a conductive wire is wound. The core 32A is made of iron, nickel or an electromagnetic material including iron and nickel. The valve body 33 is constituted by iron, nickel or a magnetic material including iron and nickel and is supported in a reciprocatable manner in a direction along an axis serving as a center of the control flow passage LC. The coil spring 34 includes a function to apply a biasing force to the valve body 33 in a direction where the valve body 33 closes the control flow passage LC. The biasing force is specified so that the control flow passage LC is opened in a case where a pressure of the cooling water flowing through the control flow passage LC is generated.

According to the aforementioned construction, the valve body 33 is closely in contact with an inner end portion of the control flow passage LC by the biasing force of the coil spring 34 even in a state where electric power is not supplied to the electromagnetic solenoid 32 as illustrated in FIG. 5. The control flow passage LC is maintained in a closed state accordingly. In a case where the water pump 2 is driven in the aforementioned closed state, the valve body 33 is opened by the pressure of the cooling water so that the flow of the cooling water to the discharge tube 35 from the control flow passage LC is permitted as illustrated in FIG. 6. On the other hand, in a case where the electric power is supplied to the electromagnetic solenoid 32, the valve body 33 is suctioned to contact the inner end portion of the control flow passage LC by an electromagnetic force even when the water pump 2 is driven so that the valve body 33 is maintained in a closed state.

Specifically, the on-off valve V2 is simply configured with a small number of movable portions and is less broken down. For example, the on-off valve V2 is configured to open by the pressure of the cooling water even at a time of disconnection of the conductive wire of the electromagnetic solenoid 32 so that circulation of the cooling water is inhibited from being deteriorated.

Control Apparatus: Control Method

As illustrated in FIG. 1, the control apparatus 10 is configured to include a microprocessor and a DSP, for example. The control apparatus 10 also includes a circulation rate setting portion 12 constituted by software, a cooling water controlling portion 13, a malfunction determining portion 14, a forcible opening portion 15 and an availability determining portion 16.

The circulation rate setting portion 12 specifies a target circulation rate of the cooling water necessary for maintaining the engine E at an appropriate temperature based on a water temperature measured by the water temperature sensor 5. The cooling water controlling portion 13 controls the flow control valve V1 and the water pump 2 so as to circulate the target circulation rate of the cooling water specified by the circulation rate setting portion 12. In a case where warm-up is required such as immediately after the start of the engine E, for example, the target circulation rate of the cooling water is zero and the cooling water controlling portion 13 does not perform the control for specifying the flow amount of the cooling water.

The malfunction determining portion 14 determines whether or not a malfunction occurs at the flow control valve V1 based on a detection result of the potentiometer 45. The forcible opening portion 15 performs a control for forcibly opening the on-off valve V2 in a case where the malfunction determining portion 14 determines that the flow control valve V1 is broken down. The availability determining portion 16 determines whether or not the temperature of the cooling water reaches an air conditioning available temperature in a case where a heating request of the vehicle is obtained.

The circulation rate setting portion 12, the cooling water controlling portion 13, the malfunction determining portion 14, the forcible opening portion 15 and the availability determining portion 16 may be constituted by hardware such as logic, for example, or by a combination of software and hardware.

Figure 7:
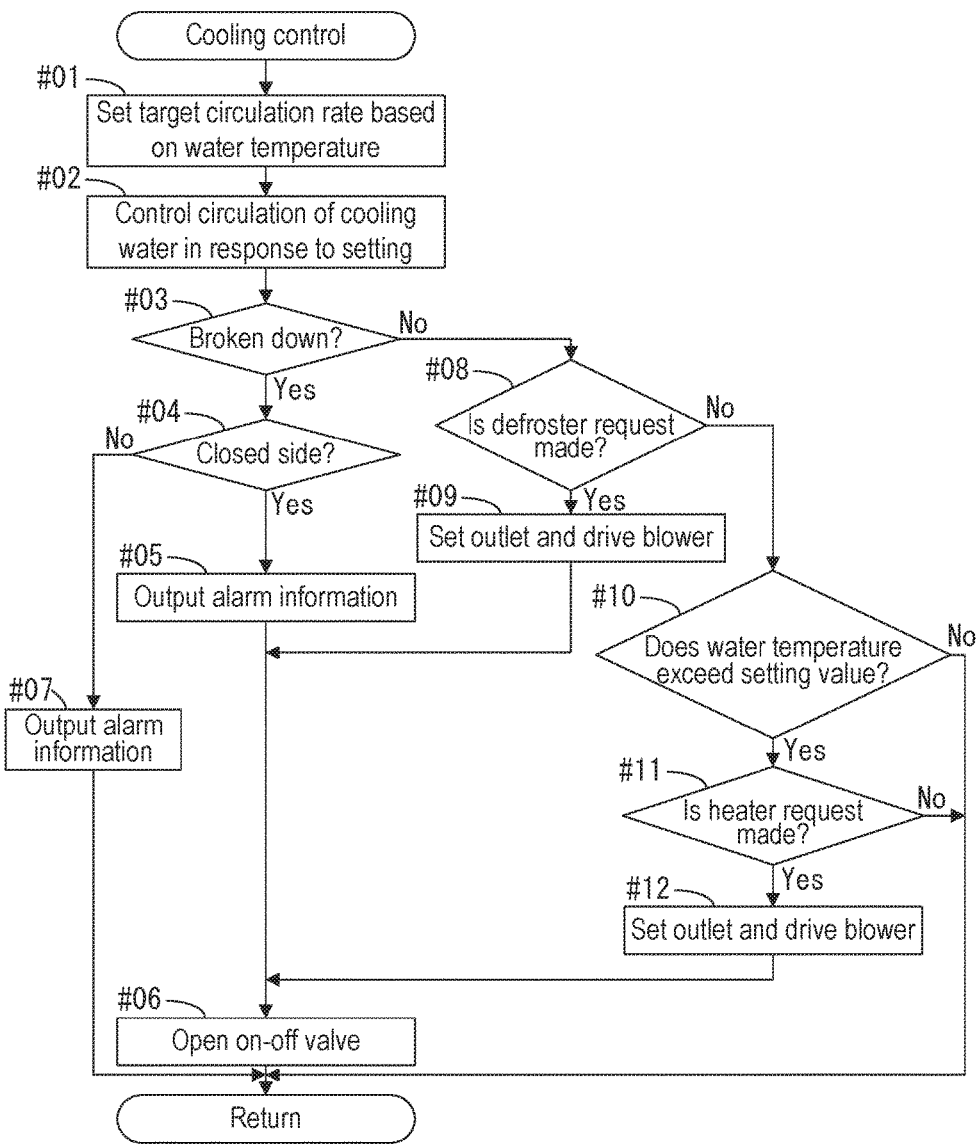
FIG. 7 is a flowchart of a cooling control.

An outline of a cooling control by the control apparatus 10 is described in a flowchart of FIG. 7. In a case where the engine E is operated, the circulation rate setting portion 12 sets the target circulation rate of the cooling water necessary for maintaining the engine E at an appropriate temperature based on a measurement result of the water temperature sensor 5. In response to the aforementioned setting, the cooling water controlling portion 13 controls the flow control valve V1 and the water pump 2 to obtain the target circulation rate (steps #01 and #02).

In the aforementioned step #01, in a case where the water temperature measured by the water temperature sensor 5 is low such as immediately after the start of the engine E, the target circulation rate specified by the circulation rate setting portion 12 is zero. The flow control valve V1 therefore maintains each of the first flow passage L1 and the second flow passage L2 in a closed state. The water pump 2 is maintained in a stopped state so that the warm-up is enhanced without circulation of the cooling water.

In the next step #02, the warm-up progresses so that the water temperature measured by the water temperature sensor 5 increases. The circulation rate setting portion 12 sets the target circulation rate when cooling is required. In response to the above, the cooling water controlling portion 13 specifies a target opening between the first flow passage L1 and the second flow passage L2. In a state where a detection signal of the potentiometer 45 is fed-back to obtain the aforementioned target opening, the valve control motor 44 is controlled. A drive speed of the water pump 2 is set accordingly. As a result, an appropriate amount of cooling water is supplied to each of the first flow passage L1 and the second flow passage L2 at the flow control valve V1.

In a case where the circulation of the cooling water is started in the aforementioned manner, the malfunction determining portion 14 determines whether or not the flow control valve V1 is broken down (step #03). When the breakage is determined by the aforementioned determination, it is determined whether or not the flow control valve V1 is at a closed side (step #04). In a case where the flow control valve V1 is at the closed side (nearly fully closed state), alarm information is output to open (forcibly open) the on-off valve V2 (steps #05 and #06).

The control for opening the on-off valve V2 stops power supply to the electromagnetic solenoid 32.

In a case where the flow control valve V1 which is determined to be broken down is not at the closed side in step #04, the cooling water is able to flow to the first flow passage L1 via the flow control valve V1 even when the on-off valve V2 is left in a malfunction state. Thus, the alarm information is simply output (step #07) and the on-off valve V2 is inhibited from being forcibly opened.

That is, the flow control valve V1 may cause a malfunction of a portion of the reduction gear 43 or the valve control motor 44. In the control for setting the opening of the flow control valve V1, the detection signal of the potentiometer 45 is fed back. Thus, in a case where changes in signal are not detectable at the potentiometer 45 while a control for driving the valve control motor 44 of the flow control valve V1 is being executed, the malfunction is possible to be determined. In a case where the flow control valve V1 is broken down at the closed side, the supply of the cooling water to each of the first flow passage L1 and the second flow passage L2 may be impossible. In a case where the aforementioned malfunction occurs, the forcible opening portion 15 interrupts the power supply to the electromagnetic solenoid 32 of the on-off valve V2 to thereby achieve opening of the on-off valve V2.

Accordingly, in a case where the flow control valve V1 is broken down while being maintained at the closed side, the cooling water is supplied to the heater core 4 at which heat radiation is then conducted to thereby restrain overheat of the engine E.

The alarm information is utilized for turning-on a lamp at a panel in front of a driver's seat or for displaying a message or an icon indicating that the flow control valve V1 is in a malfunction state at a display for navigation, for example. The alarm information is output so that the malfunction state may be immediately addressed.

In a case where it is determined that the flow control valve V1 is not broken down at step #03 and a defroster request (operation for sending the warm air to a defroster) is made by a manual operation on the air conditioning setting portion 11, the defroster damper 21A is controlled to blow out the air within the duct from the defroster outlet 21 and the blower motor 25M is driven to thereby open the on-off valve V2 (steps #08, #09 and #06).

That is, the defroster supplies the warm air for the purposes of removing frost and condensation at the windshield. Thus, regardless of the temperature of the cooling water, the cooling water is supplied to the heater core 4 and the blower motor 25M is driven to open the defroster damper 21A. Accordingly, a control for heating wind from the blower 25 at the heater core 4 to send the heated wind from the defroster outlet 21 is performed.

Specifically, it may be assumed that the temperature of the cooling water does not reach a temperature sufficient for obtaining the warm air at a timing at which the defroster request is made. Nevertheless, it is important to generate a flow of wind for removing frost and condensation at the windshield. Thus, regardless of the water temperature, the air from the heater core 4 is supplied to the defroster outlet 21.

Next, in a case where it is determined that the flow control valve V1 is not broken down at step #03 and a heater request (an example of a heat exchanging request: control for supplying the warm air to the face outlet 22 or the foot outlet 23) is made by a manual operation on the air conditioning setting portion 11 under circumstances where the defroster request is not made and the water temperature measured by the water temperature sensor 5 exceeds a setting value, the on-off valve V2 is opened (steps #10 to #12 and step #06).

In the control for supplying the warm air to the face outlet 22 or the foot outlet 23, the warm air directly makes contact with a driver's body, for example. Thus, the temperature of the cooling water necessarily sufficiently increases. In addition, step #10 is a determination by the availability determining portion 16. The water temperature for determination is set to a value exceeding 80° C. Thus, only in a case where it is determined that the temperature of the cooling water exceeds 80° C. (a specific example of the setting value) at step #10, the control for supplying the warm air to the face outlet 22 or the foot outlet 23 is conducted.

Accordingly, when the heater request (control for supplying the warm air to the face outlet 22 or the foot outlet 23) is made by the manual operation on the air conditioning setting portion 11, the blower motor 25M is driven in a state where the cooling water at the temperature sufficient for obtaining the warm air is supplied to the heater core 4. The face damper 22A or the foot damper 23A is opened to send out the warm air through the corresponding outlet.

Modified Example of Control of Step #10

As a determination method by the availability determining portion 16 at step #10 as mentioned above, a determination without the water temperature sensor 5 is considerable.

As an example, time during which the cooling water is supplied to the EGR cooler 3 from the flow control valve V1 at the second flow passage L2 is integrated. When the resulting integrated value (integrated time) reaches a setting value (i.e., when a setting time has elapsed from a supply start), it may be determined that the cooling water reaches the temperature sufficient for obtaining the warm air.

In the present modified example, the control is performed because it is presumable that the temperature of the engine E sufficiently increases and the temperature of the cooling water reaches the temperature sufficient for obtaining the warm air in a case where the integrated time for the cooling water flowing to the EGR cooler 3 exceeds the setting value (for example, 100 seconds).

In addition, in another modified example of step #10, a processing where an amount of cooling water supplied to the EGR cooler 3 from the flow control valve V1 at the second flow passage L2 is integrated is performed. When the resulting integrated value (integrated supply amount) reaches a setting value, it is determined that the cooling water reaches the temperature sufficient for obtaining the warm air.

In the present modified example, the integrated supply amount is obtained by a calculation based on a rotation speed of the water pump 2, the opening of the flow control valve V1 and time during which the cooling water flows. The control is performed in a case where a setting amount (for example, 5 litters) of cooling fluid flows to the EGR cooler 3 because it is presumable that the temperature of the engine E sufficiently increases and the temperature of the cooling water reaches the temperature sufficient for obtaining the warm air Modified Example of Control Method In the control method, the defroster request and the heater request are permitted in a normal state where the flow control valve V1 is not broken down. The control method may be specified so that the defroster request and the heater request are performed even in a state where the flow control valve V1 is broken down.

The control method is specified in the aforementioned manner so that the warm air is sent out from the defroster outlet 21 or the warm air is sent out from the face outlet 22 or the foot outlet 23 even in the state where the flow control valve V1 is broken down.

Effects of Embodiment

Accordingly, in the cooling system of the internal combustion engine of the embodiment, the flow control valve V1 is usable as the valve for adjusting the amount of cooling water supplied to the radiator and is also usable as the valve for adjusting the amount of cooling water supplied to the EGR cooler 3. Thus, as compared to a construction where exclusive valves are provided for the first flow passage L1 and the second flow passage L2, a cost reduction is achievable.

The on-off valve V2 is simply configured to open and close by the driving of the electromagnetic solenoid 32. Thus, as compared to a construction where the on-off valve is opened and closed by an electric motor, for example, a malfunction may less occur. In addition, the on-off valve V2 is configured in a manner that the valve body 33 is opened by the pressure of the cooling water in a case where the power supply to the electromagnetic solenoid 32 is stopped. Thus, even in a case where the cooling water is unable to be supplied to the radiator 1 because the flow control valve V1 is broken down in the closed state, the valve body 33 of the on-off valve V2 is opened by the pressure of the cooling water by stopping the power supply to the electromagnetic solenoid 32. As a result, the heat radiation of the cooling water is performed at the heater core 4 to restrain overheat of the engine E.

In addition, because the temperature of the cooling water is not considered in a case where the air is sent out from the defroster outlet 21, frost or condensation at the windshield may be positively removed. In a case where the air is sent out from the face outlet 22 or the foot outlet 23, the warm air is surely sent out therefrom, which inhibits a driver, for example, at a driver's seat from feeling uncomfortable by contacting cold air.

Figure 8:
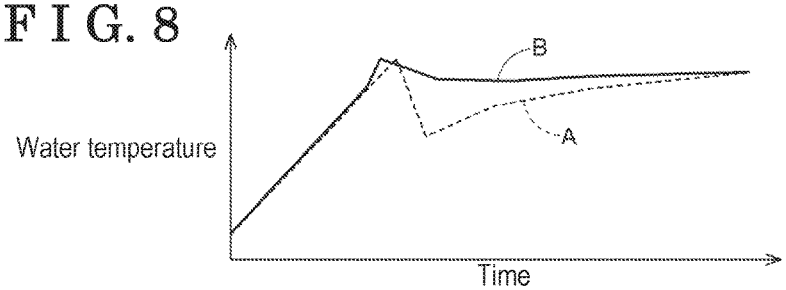
FIG. 8 is a graph illustrating changes in water temperature in a case where the flow control valve is broken down and in a case where the flow control valve is normal.

Specifically, as illustrated in FIG. 8, in a case where the on-off valve V2 is opened in a state where the flow control valve V1 is maintained at the closed side because of its malfunction, changes in water temperature measured by the water temperature sensor 5 appear as indicated by a graph A. On the other hand, in a case where the on-off valve V2 is opened in a state where the flow control valve V1 is normally controlled, changes in water temperature measured by the water temperature sensor 5 appear as indicated by a graph B.

It is obvious that, in a case where the on-off valve V2 is opened while the flow control valve V1 is being normally operated, changes in water temperature are small as compared to a case where the flow control valve V1 is broken down. In addition, it is understandable that even when the flow control valve V1 is broken down, the on-off valve V2 is opened to thereby adjust the water temperature.

Another Embodiment

The following constructions are available in addition to the aforementioned embodiment.

Figure 9:
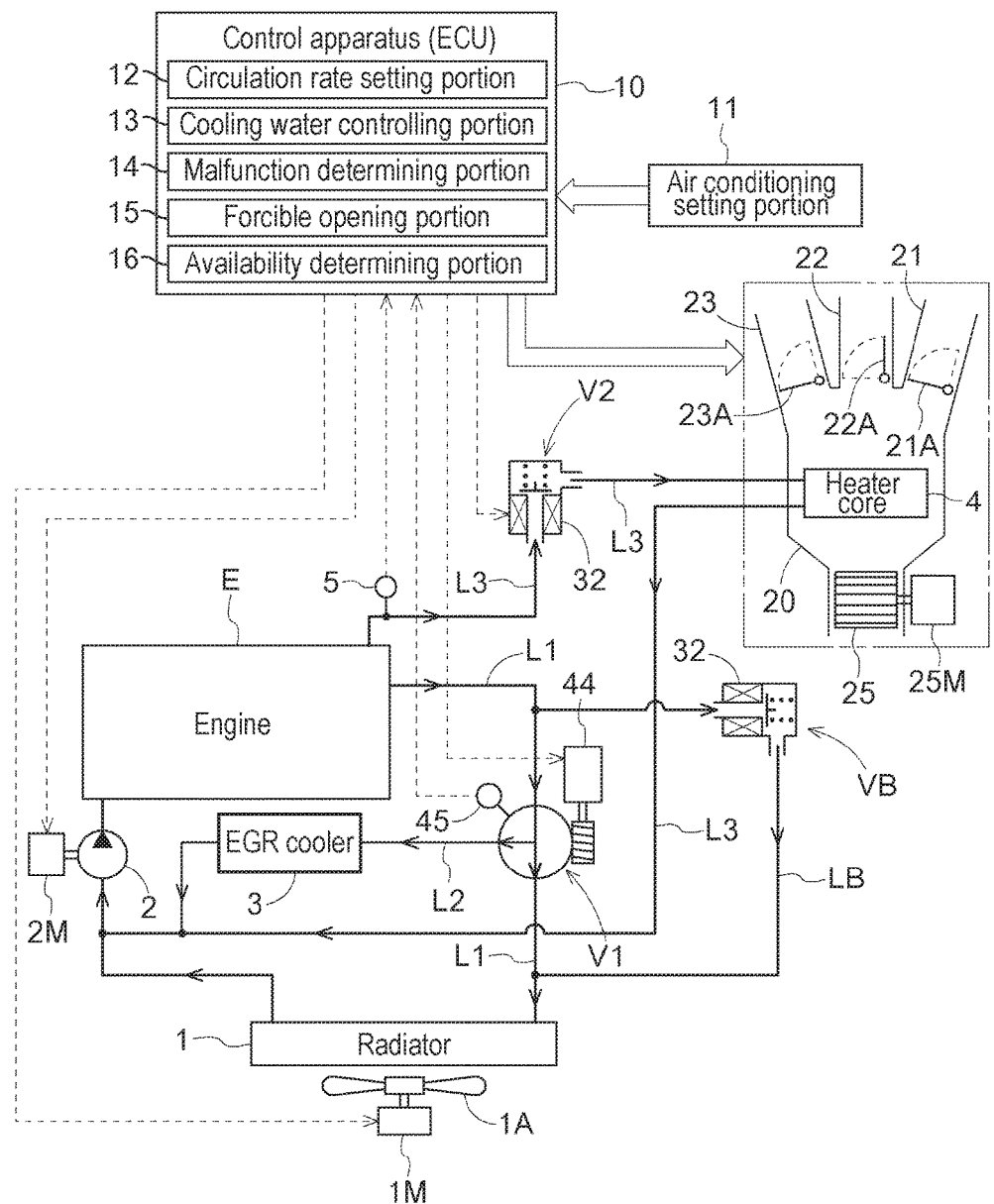
FIG. 9 is a block diagram illustrating an entire construction of the cooling system of the internal combustion engine according to another embodiment.

(a) In this another embodiment, as illustrated in FIG. 9, in addition to the similar construction to the aforementioned embodiment, a bypass flow passage LB is provided so as to send the cooling water of the first flow passage L1 at the upstream side than the flow control valve V1 to the first flow passage L1 at the downstream side than the flow control valve V1. Then, a second on-off valve VB is provided at the bypass flow passage LB while including the common configuration to the on-off valve V2.

In this another embodiment (a), in a case where the malfunction of the flow control valve V1 is not determined by the malfunction determining portion 14, the electric power is continuously supplied to the electromagnetic solenoid 32 of the second on-off valve VB to maintain a state where the cooling water is inhibited from flowing to the bypass flow passage LB. In a case where it is determined that the flow control valve V1 is broken down by the malfunction determining portion 14 of the control apparatus 10, the power supply to the electromagnetic solenoid 32 of the second on-off valve VB is stopped to thereby open the second on-off valve VB by the pressure of the cooling water flowing to the bypass flow passage LB. The cooling water is supplied to the radiator 1 so as to restrain overheat of the engine E.

(b) The on-off valve V2 is configured so that the valve body is opened by the power supply to the electromagnetic solenoid and is maintained in the closed state by bringing the electromagnetic solenoid to a non-power supplied state. According to such construction, electric power is consumed for opening the on-off valve V2, however, electric power is not required when supply frequency of the cooling water to the heater core 4 is small, for example, thereby achieving power saving.

(c) A determination method of the malfunction determining portion 14 is specified so that the flow control valve V1 is determined as broken down in a case where the water temperature measured by the water temperature sensor 5 is inhibited from decreasing after the flow control valve V1 is controlled to increase the flow amount of the cooling water flowing through the first flow passage L1. Accordingly, the flow control valve V1 without the potentiometer 45 is usable.

INDUSTRIAL AVAILABILITY

The present invention is applicable to a cooling system supplying a cooling medium of an internal combustion engine to a radiator and a heat exchanging portion which is different from the radiator.

EXPLANATION OF REFERENCE NUMERALS 1 radiator
3 first heat exchanging portion (EGR cooler)
5 temperature sensor (water temperature sensor)
4 second heat exchanging portion (heater core)
10 control portion (control apparatus)
14 malfunction determining portion
16 availability determining portion
32 electromagnetic solenoid
44 electric actuator (valve control motor)
E internal combustion engine (engine)
L1 first flow passage
L2 second flow passage
L3 third flow passage
LB bypass flow passage
V1 flow control valve
V2 on-off valve
VB second on-off valve

The invention claimed is:

1. A cooling system of an internal combustion engine, comprising:
a first flow passage circulating a cooling medium through an internal combustion engine and a radiator;
a second flow passage branching from the first flow passage to circulate the cooling medium to a first heat exchanging portion which is different from the radiator;
a third flow passage provided separately from the first flow passage to circulate the cooling medium from the internal combustion engine to a second heat exchanging portion;
a flow control valve provided at a branching portion from the first flow passage to the second flow passage and configured to adjust an amount of the cooling medium supplied to each of the first flow passage and the second flow passage by a control of an electric actuator;
an on-off valve provided in series with the second heat exchanging portion at the third flow passage and opening and closing the third flow passage by a control of an electromagnetic solenoid;
a control portion controlling the flow control valve and the on-off valve based on a heating state of the cooling medium; and
wherein the control portion includes an availability determining portion determining whether or not a heat removal from the cooling medium at the second heat exchanging portion is available, the control portion opening the on-off valve in a case where the availability determining portion determines that the heat removal from the cooling medium is available and a heat exchanging request is made to the second heat exchanging portion.

2. The cooling system of the internal combustion engine according to claim 1, wherein the control portion includes a malfunction determining portion determining a malfunction of the flow control valve, the control portion performing a control for opening the on-off valve in a case where the malfunction determining portion determines the malfunction.

3. The cooling system of the internal combustion engine according to claim 1, wherein the availability determining portion determines that the heat removal from the cooling medium is available in a case where a temperature of the cooling medium detected by a temperature sensor exceeds a setting value.

4. The cooling system of the internal combustion engine according to claim 1, wherein the availability determining portion determines that the heat removal from the cooling medium is available in a case where an integrated supply time of the cooling medium supplied to the first heat exchanging portion via the second flow passage exceeds a setting value.

5. The cooling system of the internal combustion engine according to claim 1, wherein the availability determining portion determines that the heat removal from the cooling medium is available in a case where an integrated supply amount of the cooling medium supplied to the first heat exchanging portion via the second flow passage exceeds a preset value.

6. The cooling system of the internal combustion engine according to claim 1, further comprising:
a bypass flow passage bypassing the flow control valve at the first flow passage from an upstream position relative to the flow control valve; and a second on-off valve provided at the bypass flow passage and including a same construction as the on-off valve, wherein the control portion includes a malfunction determining portion determining a malfunction of the flow control valve, the control portion opening the second on-off valve in a case where the malfunction determining portion determines the malfunction.

* * * * *